United States Patent [19]

Mathews et al.

[11] Patent Number: 4,581,745
[45] Date of Patent: Apr. 8, 1986

[54] ELECTRIC ARC MELTING APPARATUS AND ASSOCIATED METHOD

[75] Inventors: David R. Mathews; Robert J. Krieger, both of Las Vegas, Nev.

[73] Assignee: Timet, Pittsburgh, Pa.

[21] Appl. No.: 691,945

[22] Filed: Jan. 16, 1985

[51] Int. Cl.$^4$ ............................................. H05B 7/20
[52] U.S. Cl. ..................................... 373/107; 164/514
[58] Field of Search ........................ 373/67, 70, 107; 164/146, 147.1, 502, 503, 504, 514, 515

[56] References Cited

U.S. PATENT DOCUMENTS

| | | | |
|---|---|---|---|
| 2,652,440 | 9/1953 | Simmons | 13/11 |
| 2,761,002 | 8/1956 | Laird et al. | 373/107 X |
| 2,849,658 | 8/1958 | Johnson | 373/107 X |
| 3,636,228 | 1/1972 | Comenetz | 13/12 |
| 3,680,163 | 8/1972 | De Corse | 13/9 |
| 3,683,094 | 8/1972 | Schlienger | 373/107 |
| 4,149,024 | 4/1979 | Stenkvist et al. | 373/107 |

Primary Examiner—Roy N. Envall, Jr.
Attorney, Agent, or Firm—Arnold B. Silverman

[57] ABSTRACT

Electric arc apparatus and an associated method are provided. Pairs of aligned cooperating coils are positioned on opposed sides of a crucible. In a preferred embodiment, three such pairs which overlap each other are employed so as to sequentially generate magnetic fields so as to provide a uniform magnetic field which will rotate the arc between the electrode and the crucible interior in a first direction. The arc rotation may be reversed. It is preferred that the maximum magnetic field created by each pair of coils be out of time phase with respect to the other coil's magnetic field. This apparatus and the associated method serve to resist undesired irregularities in the ingot exterior surface which irregularities would require subsequent treatment and result in loss of metal.

33 Claims, 7 Drawing Figures

ELECTRIC ARC MELTING APPARATUS AND ASSOCIATED METHOD

BACKGROUND OF THE INVENTION

1. Field of the Invention

The present invention relates to electric arc apparatus and an associated method and, more specifically, it relates to means for effectively resisting formation of undesired surface irregularities in the ingot created in such apparatus.

2. Description of the Prior Art

It has been known previously to employ vacuum electric arc furnaces wherein a consumable electrode is Cprogressively melted by means of an electric current which is run through the electrode and arcs to molten metal contained within a crucible. The consumable electrode is progressively advanced into the crucible so as to maintain the desired spacing between the electrode and the molten metal bath. It is known to employ a copper-walled crucible inside of a jacket through which cooling material such as water, for example, is passed.

With respect to such systems, surface irregularities on the resultant ingot have generally made it necessary to grind the surface in order to obtain the desired smooth surface. Surface irregularities may be caused by spatter. Spatter may be produced by the force of the electric arc causing globules of metal to be thrown into contact with the cold crucible wall above the molten pool level where chilling causes the globules to freeze into a porous nonhomogeneous mass. Also, gases evolving from the molten pool, as well as from the molten metal being discharged from the electrode, may serve to cause metal droplets to be deposited and solidified on the interior wall of the crucible. As the level of the molten pool rises, some of the liquid metal from the pool partially fuses to the porous mass along the crucible wall to produce an undesired matted surface on the ingot. Not only do such irregularities require additional processing steps to establish a uniform smooth exterior surface on the ingot, but some loss of metal is also involved.

U.S. Pat. No. 3,636,228 discloses the use of a transducer in a servo system which provides information regarding the position of an arc.

U.S. Pat. No. 3,680,163 discloses a system wherein the purification of metals, a field coil disposed within an electrode assists with effecting stirring of the melt through its influence on the arc.

U.S. Pat. No. 2,849,658 discloses pole pieces of limited scope which are adapted to provide a narrow magnetic field within the furnace. U.S. Pat. No. 2,652,440 also discloses a system wherein several local pole pieces generate narrow magnetic fields.

U.S. Pat. No. 3,683,094 discloses an arc furnace which has a rotating electrode wheel. The field imposed by the three coils tends to restrain the rotational movement of the arc produced by the rotating electrode wheel.

In spite of these prior art disclosures there remains a very real and substantial need for an effective vacuum arc furnace which will produce an ingot which possesses the desired surface smoothness.

SUMMARY OF THE INVENTION

The present invention has met the above-described need by providing apparatus and an associated method which effectively controls surface smoothness.

In a broader aspect of the invention, a crucible has an opening for receipt of an electrode which passes through the opening and extends into the crucible. An electric arc is maintained between the electrode and the molten metal bath disposed within the crucible. A first pair of electrical coils is positioned with the coils on opposite sides of the crucible in order that a magnetic field may be generated uniformly substantially across the entire crucible interior. Similarly, second and third pairs of electrical coils which are offset, but may overlap with the other coils, are provided. By sequencing the time phase of energization of the coils, each pair of coils will reach a maximum magnetic field intensity at a time which is out of phase with the others. This results in a controlled rotation of the magnetic field generated by the coils in a first direction. This magnetic field pushes the arc plasma toward the crucible wall and also causes it to move at a controlled rate in the same direction about the crucible interior. The rotating arc plasma serves to remelt the porous matted portions of the metal which have been deposited on the crucible interior wall, thereby providing a smoother, more desirable ingot surface.

Preferred means for energizing the electrical coils with a predetermined cycle, which may preferably approximate a sine wave, and with predetermined phase differences are provided.

The method of the invention preferably employs at least three pairs of electrical coils which are energized in a sequencing, out-of-phase manner so as to provide a uniform magnetic field which effects the desired rotation of the arc plasma. The order of the sequential energizing of the coils is periodically reversed so as to cause a reversal in the rotation direction of the magnetic field as well as the arc plasma in order to provide the desired grain orientation structure in the ingot.

It is an object of the present invention to provide vacuum electric arc apparatus and an associated method which will serve to minimize the undesired surface roughness of an ingot being produced.

It is a further object of the invention to provide such an apparatus and method which will minimize or eliminate the need for grinding or machining subsequent to solidification of the ingot and the inherent loss of metal which occurs through such operations.

It is a further object of this invention to provide a system which produces a fully melted out smooth surface on the exterior of the ingot while preserving the desired homogeneity.

It is a further object of the invention to provide a system which imposes a substantially uniform magnetic field throughout the width and length of the crucible.

These and other objects of the invention will be more fully understood from the following description of the invention on reference to the illustrations appended hereto.

DESCRIPTION OF THE PREFERRED EMBODIMENTS

Figure 1:
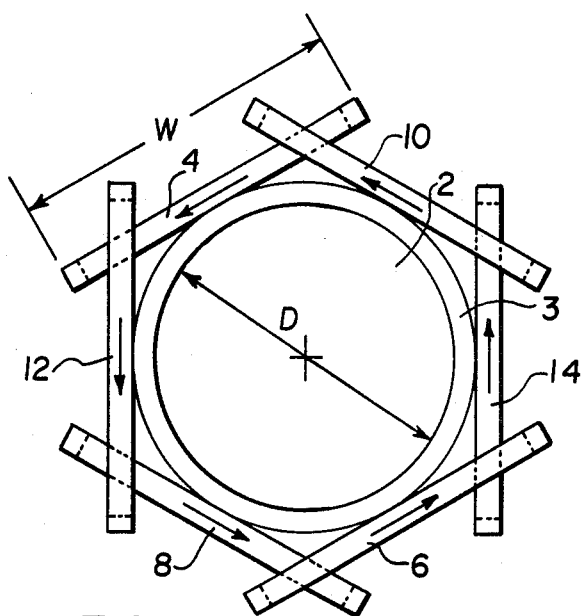
FIG. 1 is a partially schematic top plan view of a form of apparatus usable in the present invention.
Figure 2:
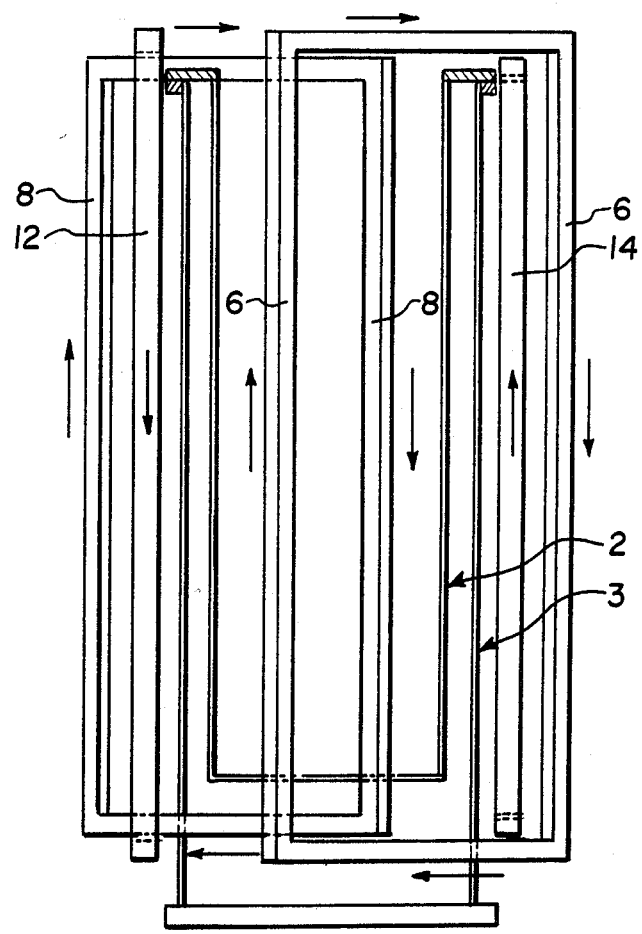
FIG. 2 is a front elevational view of the apparatus of FIG. 1.

Referring more specifically to FIGS. 1 and 2, there is shown a crucible 2 and cooling jacket 3 which in the form shown are generally cylindrical in section. Disposed exteriorly of the crucible 2 and cooling jacket 3 in surrounding relationship are air coils which in the form shown have a generally rectangular configuration. The arrows in FIGS. 1 and 2 indicate the direction of winding of the coils. It will be appreciated that by looking at the direction of winding, one may determine the direction in which a magnetic field will be created using conventional rules of electricity and magnetism.

The preferred embodiment of the invention employs three pairs of coils although additional pairs may be employed if desired. Coils 4 and 6 are a pair and are positioned on opposed sides of the crucible 2. It is noted that in the form shown the coils 4, 6 have the winding wraps extending in the opposite directions. It is preferred that the windings of a first coil of a paired coil be wound parallel to the windings of the other coil of the pair. An axis passing through the center of both coils will preferably pass through the center of the crucible. Similarly, coils 8 and 10 are a pair and coils 12 and 14 are a pair. It will be appreciated that each of the coils is preferably of greater width W than the internal diameter D of the crucible. As a result, the magnetic field generated by the coil will cover the entire width of the crucible interior. As a result of uniformity of wrapping of the coils coupled with this coil width W, a substantially uniform magnetic field traversing the full width of the crucible interior will be generated upon suitable energization of the coils. The coil pairs are preferably wound in series so as to establish an aiding magnetic field polarity for a given current direction in the series circuit. Each coil may, for example, have 250 turns of No. 12 solid enamel on copper wire. While air coils are presently preferred, solid cores could be employed, if desired.

A further preferred feature of the invention illustrated in FIGS. 1 and 2 is the fact that in order to provide a magnetic field of approximately uniform intensity across the crucible width, the sides of the coils of one pair overlap the sides of the coils of the adjacent pairs. In order to accomplish this objective, as is shown in FIG. 2, adjacent rectangular coils are of different height so as to permit internesting. As is shown in FIG. 2, coils 14 and 8 are of lesser height than coils 12 and 6 thereby permitting the former to be received within the latter. While this overlap is not essential, it is preferred as it reduces the space required by the coils and reduces the field strength required from the coil pairs to provide the desired field strength at the arc zone.

In a preferred practice of the invention, a consumable electrode will be employed in production of titanium, zirconium, steel, alloys of any of these materials as well as other consumable arc melted materials.

As will become apparent from the description which follows, it is contemplated that the respective pairs of coils will be electrically energized in such fashion that each pair reaches a maximum intensity of aiding magnetic field generation at a time which is out of phase with respect to the maximums generated by the others. The net magnetic field intensity at any instant of time is of substantially constant magnitude and rotates in a first direction at a rate dependent upon the frequency of electrical energization. In this manner, the arc between the electrode and the molten metal bath can be urged to a position adjacent to the crucible interior wall by interaction with the magnetic field generated by the coils and the arc may be caused to revolve about the interior wall of the crucible in a first direction. By reversing the sequence of energizing of the coils, the revolving of the arc may be changed so as to be effected in the opposite direction. In a preferred embodiment of the invention it is contemplated that the maximum magnetic field generation and direction for each pair of coils will be about 60 degrees out of phase from the next pair of coils which in turn will be 60 degrees out of phase from the next succeeding pair of coils. It is also preferred that the mode of energizing the coils be such as to approximate the sine wave.

Figure 3:
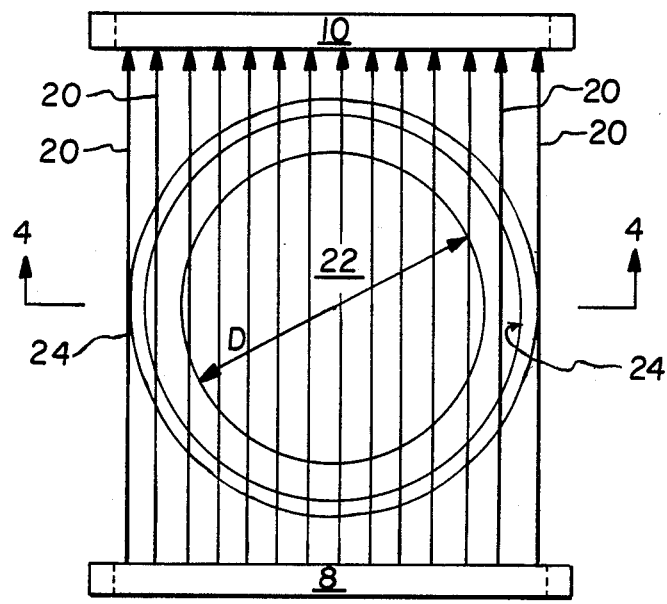
FIG. 3 is a schematic view illustrating generation of a magnetic field across the crucible.

Referring to FIG. 3 there is shown a pair of coils 8, 10 which are spaced from each other and the electrode 22 which is generally cylindrical and of lesser diameter than the crucible wall 24. Coil 8 has been energized and sends a uniform field of flux lines represented schematically as parallel lines 20, across the full width of the crucible. In the form shown, the crucible has a vertical axis and is generally upwardly open with the coils generating a horizontal magnetic field. The field applied as shown in FIG. 3 will cause the arc between the electrode, which is in spaced, overlying relationship with respect to the metal bath, and the molten bath to move toward the crucible wall at a position normal to the direction of the field. The cycling of energizing of the coils is such that at a certain point the current applied to coils 8 and 10 will decrease and the current applied to coils 6 and 4 (FIG. 1) will increase with this procedure being followed until the full cycle has been accomplished. It is generally desired to operate the system in such a way as to provide about 1 to 20 revolutions of the arc per minute and preferably about 2 to 10. It is generally preferred to effect reversal of the direction of arc rotation about every 5 to 10 minutes, although any reversal period of about one minute or greater may be used.

Figure 4:
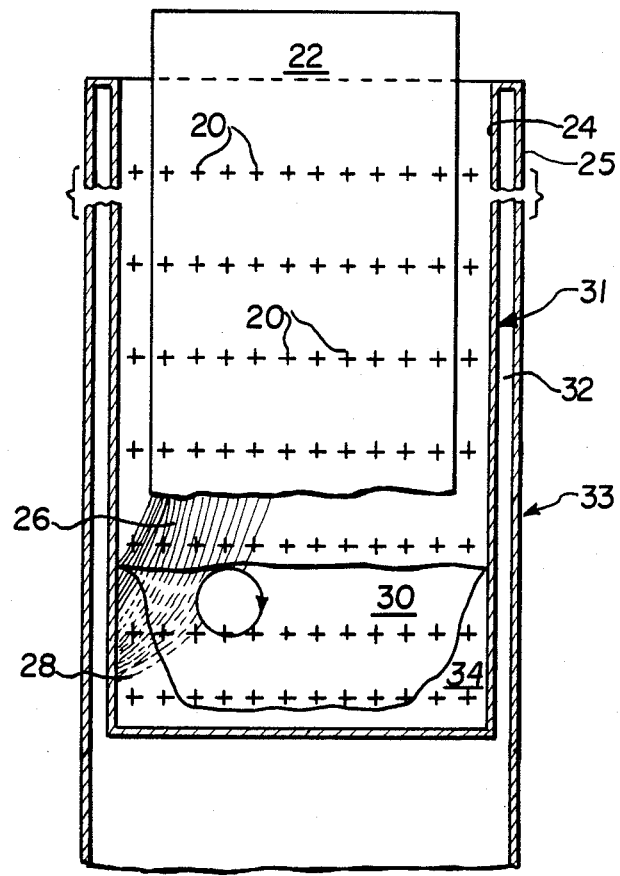
FIG. 4 is a cross-sectional schematic view of the crucible as taken through 4—4 of FIG. 3.

As shown in the elevational view of FIG. 4, the flux lines are shown at 20 as cross marks with the arc 26 reaching toward the peripheral wall 24 of the crucible. This produces a vertical turning action in the metal bath 30 which combined with direct impingement and rotation of the arc 26 produces surface remelting thereby providing the desired ingot smoothness on surface 34. As is shown in FIG. 4, the magnetic field extends throughout the full height of the crucible, the electrode may extend upwardly beyond the magnetic field. A dynamic force on the metal bath is caused by movement of the arc and the associated metal transfer. There is also a force exerted on the molten bath by the interaction of the magnetic field created by the electric current flowing in the liquid metal and the magnetic field generated by the coils. This interaction causes the major stirring effect in the molten bath.

The space 32 between crucible wall 24 and jacket wall 25 is adapted to provide a chamber for flow of cooling fluid such as water. The crucible itself may be made of any suitable nonmagnetic material such as copper, for example. The jacket may be made of any suitable nonmagnetic material, such as stainless steel, for example.

The arrangement of a pair of coils of the type employed in the present invention may take the form modified Helmholtz coils such as is disclosed in Standard Handbook for Electrical Engineers, Tenth Edition, McGraw-Hill Book Company, page 381, 1969.

Figure 5:
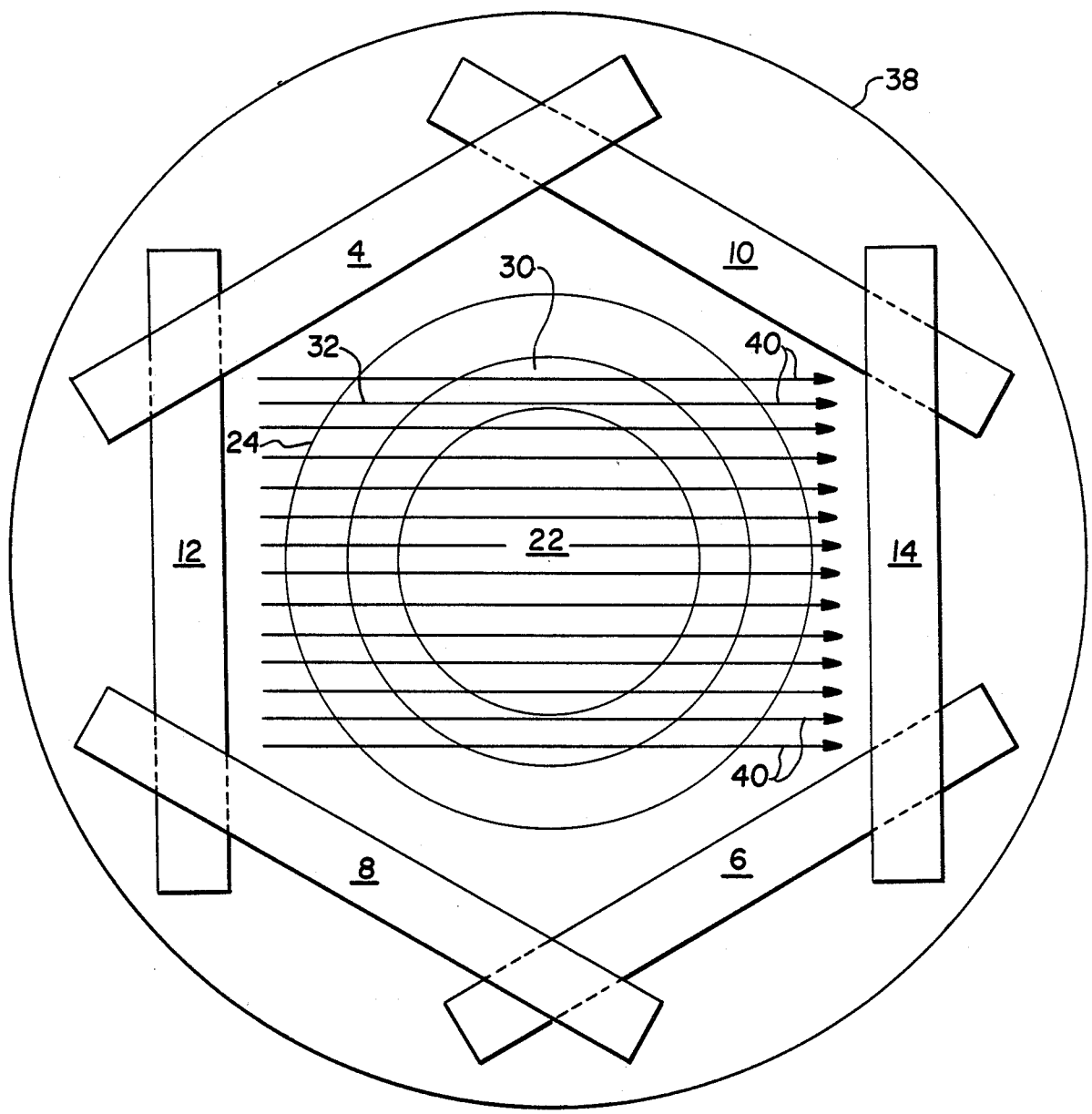
FIG. 5 is a schematic illustration further illustrating the principles of the invention.

FIG. 5 shows further details of a preferred embodiment of the system. The extent of overlap of the coils is shown more precisely. In general, it is desired to have the coils of a width greater than the interior diameter of the crucible 2 and the overlap such that in sequentially energizing the coils, gaps in the magnetic field in terms of continuity across the transverse extent of the crucible interior will be resisted. As is shown in FIG. 4, within each horizontal level the magnetic field is substantially continuous. The term "sequential" and related terms as used herein shall mean that the maximum magnetic field generation of a given pair of coils will be out of phase with that of the other pair of coils. It shall not be interpreted as meaning that no two coils shall be energized simultaneously. The sequence relates to phase as distinguished from termination of energizing of one coil completely before energizing another.

Also shown in FIG. 5 is the shield 38 which is disposed exteriorly of the coils and serves to resist passage of magnetic radiation therethrough. The shield may conveniently be made of any suitable magnetically permeable material such as carbon steel and silicon steel, for example. This shield 38 not only serves to minimize the undesired effect of stray magnetic fields disposed externally of the shield 38, but also serves to provide a low reluctance return path for the magnetic field generated by the coils. The shield 38 is preferably at least as high as the coils. In the form shown in FIG. 5, coil pair 12-14 has been energized at peak amplitude and coil pair 4-6 as well as coil pair 8-10 have been energized at one-half peak amplitude in the aiding directions and are mutually generating the magnetic field lines generally indicated by the reference number 40.

Figure 6:
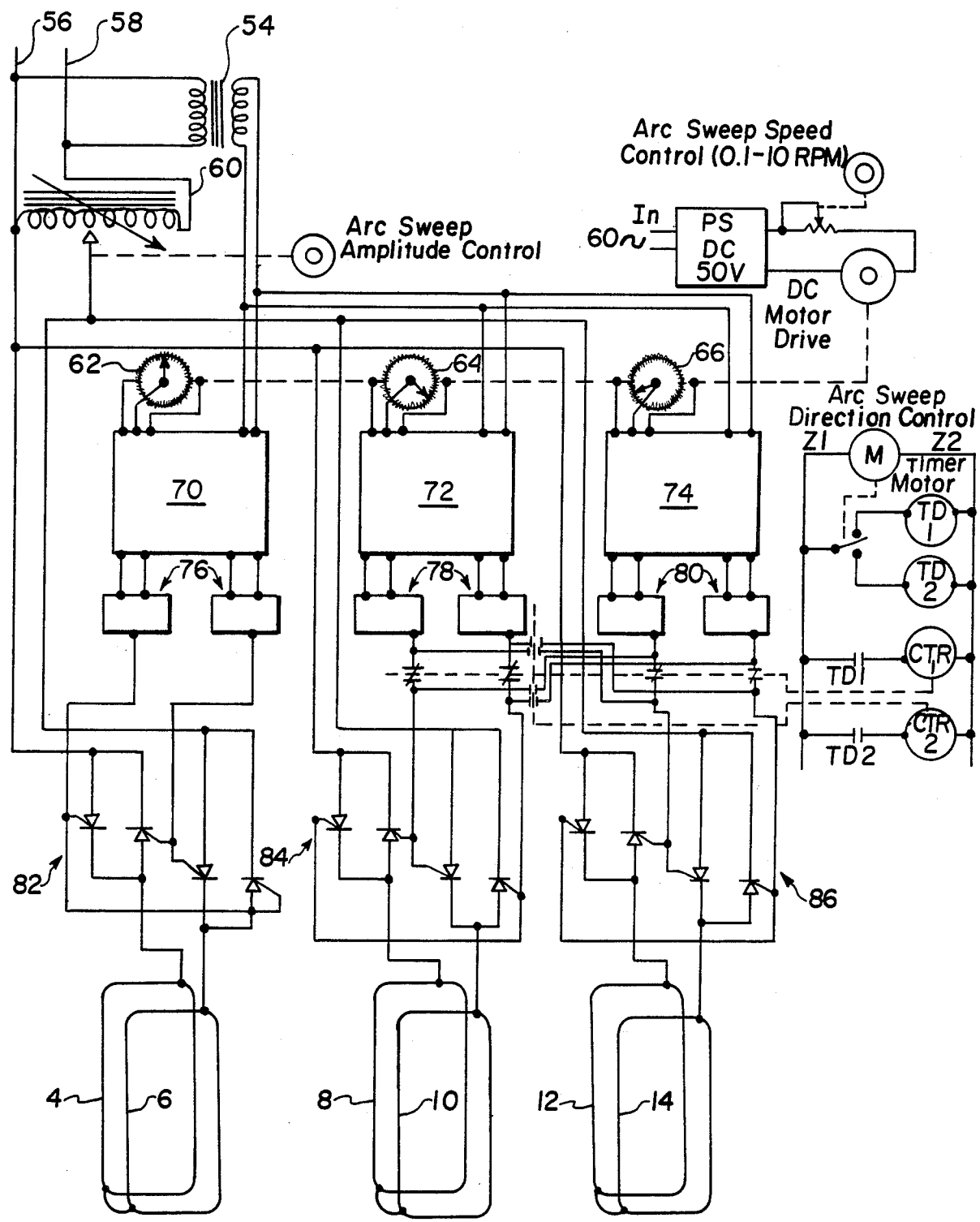
FIG. 6 is a schematic illustration of a form of means for controlling the energizing of the electrical coils.

FIG. 6 shows schematically a means of effecting the desired coil energization with the desired phase difference. Coil pairs 4-6, 8-10 and 12-14 each have the first coil with which they are paired electrically connected in series to the second coil in the pair in such a manner that the magnetic field generated by each coil is in the same polarity and direction as that generated by the other. A suitable AC electric current is imposed upon this form of the coil energizing means through leads 56, 58. Variable transformer 60 serves to reduce the voltage to about 0 to 160 VAC. A transformer 54 serves to provide 115 VAC control power, a series of motor driven sine wave potentiometers 62, 64, 66 (or solid state equivalent) are ganged and each potentiometer is associated with a pair of coils. It is noted that the potentiometers are out of phase by 120 degrees. Logic circuits 70, 72, 74 which are respectively associated with potentiometer 62, 64, 66 and bridge circuits 82, 84, 86 serve to provide 0 to ±75 amp, at 0 to ±150 volt DC output from the bridge circuits.

Firing circuits 76, 78, 80, are respectively associated with logic circuits 70, 72, 74 and serve to control the firing angles of the SCR bridge circuits 82, 84 and 86. Solid state bridges 82, 84, 86 serve to generate the DC voltage and current which drives the coil pairs 4-6, 8-10 and 12-14. It will be appreciated that in this manner the energization of the coils in the desired sequence and with the desired relationship to provide a rotating magnetic field of constant magnitude is accomplished. Reversing the direction of magnetic field rotation is effected by switching the output from any two of the three firing circuits, such as 78 and 80.

Figure 7:
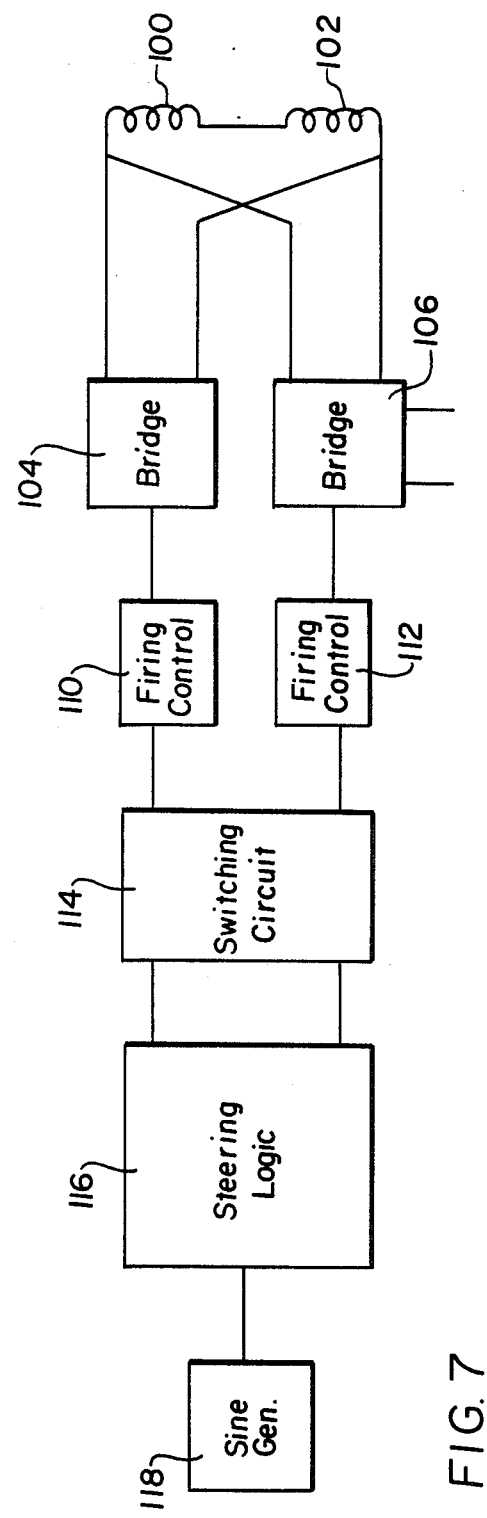
FIG. 7 is a schematic illustration showing a means for controlling the coils of the present invention.

FIG. 7 illustrates the operation of one phase of the low frequency sine generator. A pair of coils such as coils 4-6, 8-10 or 12-14 has been indicated by the numbers 100 and 102. These coils are electrically connected to solid state bridges 104, 106 which serve to provide the sine wave variable DC energizing current. The full wave SCR bridge 104 is fired for several hundred cycles of the 60 Hz supply voltage in order to supply current in one direction through the coils 100, 102. Full wave SCR bridge 106 is then fired for several hundred cycles of 60 Hz supply voltage to provide current in the opposite direction through coils 100, 102. At any instant in time only one bridge circuit, 104 or 106, supplies current to the coil pair 100, 102. The firing controls 110, 112 serve to control the amplitude of the energizing current of the coils 100, 102. Switching circuits 114 receive guidance from the steering logic 116, which may be any desired form of logic, and sine generator 118 which serves to cause the current output to the coils 100, 102 to approximate a sine wave. The sine generator 118 is preferably of a low frequency type (about 1 to 20 cpm) to control the signal voltage to the firing control circuits 110, 112. In order to reverse the direction of coil current, the switching circuit turns bridge 104 off and bridge 106 on in order to conduct in a similar manner. The magnitude of the coil current is controlled by firing controls 110, 112 which serves to alter the output voltage from bridges 104, 106.

The method of the present invention contemplates, therefore, providing a crucible and molten metal within the crucible and an electrode extending into the crucible at a desired distance from the metal bath. Pairs of coils which generate magnetic fields are disposed around the exterior of the crucible and are sequentially energized so that their generation of maximum magnetic fields are mutually out of phase, as by about 60 degrees. The current which energizes the respective coils is preferably regulated so as to approximate a sine wave. The arc from the electrode to the molten metal is preferably moved to the portion of the bath adjacent to the crucible interior wall and is rotated in a first direction. By controlling the coil energizing means, the direction of rotation may be reversed and the rate of rotation as well as magnetic field strength generated by a particular coil pair may be altered. The horizontal magnetic field interacts with the field generated by the DC arc current and causes the rotating arc plasma to effect remelting of the solidified material at the surface of the ingot to thereby provide the desired smooth surface.

While particular emphasis has been placed herein on vacuum systems and methods, the invention is not so limited. While for convenience of illustration and disclosure reference has been made herein to a crucible which is circular in plan other shapes such as rectangular, for example, may be employed.

While it is preferred that a minimum of three pairs of coils be employed it will be appreciated that greater numbers such as four or six pairs, for example, may be employed, if desired.

It will be appreciated, therefore, that the present invention has provided effective means for economically and simply establishing the desired remelted smooth surface on an ingot made by a vacuum electric arc furnace. All of this is accomplished by the use of uniquely positioned and uniquely controlled pairs of magnetic field generating coils.

Whereas particular embodiments of the invention have been described above for purposes of illustration, it will be appreciated by those skilled in the art that numerous variations of the details can be made without departing from the invention as described in the appended claims.

We claim:

1. Electric arc apparatus comprising:
    a crucible having an opening for receipt of an electrode,
    an electrode passing through said opening and extending into said crucible,
    a first pair of electrical coils disposed on opposite sides of said crucible for generating a magnetic field across said crucible,
    a second pair of electric coils disposed on opposite sides of said crucible for generating a magnetic field across said crucible,
    said first pair of coils being at least partially circumferentially offset from said second pair of coils,
    a third pair of electrical coils disposed on opposite sides of said crucible for generating a magnetic field across said crucible,
    said third pair of coils being at least partially offset from said first pair of coils and said second pair of coils, and
    means for energizing said pairs of coils.

2. The electric arc apparatus of claim 1 including:
    said apparatus being vacuum electric arc apparatus.

3. The vacuum electric arc apparatus of claim 2 including:
    said pair of coils being of such size and shape with respect to said crucible as to be adapted to provide a substantially uniform magnetic field across substantially the full width of the interior of said crucible.

4. The vacuum electric arc apparatus of claim 3 including:
    said coils being so positioned with respect to said crucible as to create a generally horizontal magnetic field.

5. The vacuum electric arc apparatus of claim 4 including:
    said apparatus having only three pairs of said coils, and
    each said pair of coils having lateral portions which overlap the adjacent said pair of coils.

6. The vacuum electric arc apparatus of claim 5 including:
    shield means disposed exteriorly of said coils for resisting passage of magnetic fields to said coils from the exterior of said shield.

7. The vacuum electric arc apparatus of claim 6 including:
    said coil energizing means having means for sequentially energizing said pairs of coils so as to rotate the arc between said electrode and molten metal disposed within said crucible circumferentially about said crucible in a first direction, and
    said coil energizing means having means to reverse said arc direction of rotation.

8. The vacuum electric arc apparatus of claim 7 including:
    said coil energizing means having means to provide peak energization of said first pair of coils out of phase with peak energization of said second pair of coils which in turn has its peak energization out of phase with said third pair of coils.

9. The vacuum electric arc apparatus of claim 8 including:
    said coil energizing means having means to urge said arc to the outer edge of said electrode and carry said arc to contact with said metal bath adjacent to the inner wall of said crucible.

10. The vacuum electric arc apparatus of claim 9 including:
    said coil energizing means having means for establishing said magnetic field phase difference at about 60 degrees.

11. The vacuum electric arc apparatus of claim 10 including:
    each said coil of said coil pair being electrically connected to the other said coil of said coil pair.

12. The vacuum electric arc apparatus of claim 11 including:
    said coils having generally rectangular configurations.

13. The vacuum electric arc apparatus of claim 12 including:
    said coil energizing means having means for varying the current to each said pair of coils so as to approximate a sine wave.

14. The vacuum electric arc apparatus of claim 13 including:
    said coil energizing means having potentiometer means.

15. The vacuum electric arc apparatus of claim 14 including:
    said coil energizing means having sine generator means.

16. The vacuum electric arc apparatus of claim 2 including:
    said three pairs of coils establishing a generally hexagonal configuration in plan.

17. The vacuum electric arc apparatus of claim 2 including:
    said electrode being a consumable electrode.

18. The vacuum electric arc apparatus of claim 2 including:
    providing said coils as air coils.

19. The vacuum electric arc apparatus of claim 2 including:
    said crucible being generally upwardly open.

20. A method of operating an electric arc furnace comprising:
    providing a crucible, molten metal within said crucible, an electrode extending into said crucible and at least three pairs of electrical coils with each coil of each said pair being disposed in generally aligned relationship on opposed sides from the other coil of the same pair,
    energizing a first said pair of said coils to create a magnetic field in said crucible,
    energizing a said second pair of said coils to create a magnetic field in said crucible,
    energizing a third said pair of coils to generate a magnetic field in said crucible,
    energizing said coil pairs sequentially such that each said coil pair will generate a maximum magnetic field at a time which is out of phase with the maximum magnetic field generated by said other coils, and
    employing said magnetic field to position the arc between the electrode and the interior of said crucible and to progressively move said arc in a first direction around said crucible.

21. The method of claim 20 including:
providing said crucible in a vacuum electric arc furnace, and
providing a substantially uniform magnetic field across the interior of said crucible between each of said coil pairs in sequence.

22. The method of claim 21 including:
periodically reversing said direction of rotation of said arc.

23. The method of claim 22 including:
energizing said coil pairs in a generally sine wave pattern.

24. The method of claim 23 including: providing said crucible with a generally vertical axis and being upwardly open, and
generating said magnetic field in a generally horizontal direction.

25. The method of claim 24 including:
effecting said arc rotation at a rate of about 1 to 20 cycles per minute.

26. The method of claim 25 including:
causing said magnetic field to travel from one said coil of a said pair to the other said coil of said pair.

27. The method of claim 26 including:
establishing said magnetic fields such that substantially uniform field coverage is provided across the entire extent of said crucible interior.

28. The method of claim 27 including:
shielding said coils so as to resist passage of magnetic radiation from the coils in a direction away from said crucible.

29. The method of claim 28 including:
effecting reversal of direction of rotation of said arc about every 5 to 10 minutes.

30. The method of claim 29 including:
remelting solidified material at or adjacent said crucible interior wall by means of said arc, whereby irregularities in the surface of the ingot will be resisted.

31. The method of claim 29 including:
returning the magnetic field generated by said coils by a low reluctance return path.

32. The method of claim 31 including:
effecting said sequential energization of said coils so that the magnetic field generated by each sequential pairs of coils is about 60 degrees out of phase with the next preceding pair of coils.

33. The method of claim 32 including:
overlapping said coil pairs with adjacent said coil pairs to resist incomplete magnetic field coverage of said crucible.

* * * * *